United States Patent [19]

Harper

[11] Patent Number: 4,587,391
[45] Date of Patent: May 6, 1986

[54] SNAP IN PANEL MOUNTED CIRCUIT BREAKER

[75] Inventor: George S. Harper, Cambridge, Md.

[73] Assignee: Airpax Corporation, Cambridge, Md.

[21] Appl. No.: 624,296

[22] Filed: Jun. 25, 1984

[51] Int. Cl.[4] .............................................. H01H 9/08
[52] U.S. Cl. ..................................... 200/296; 248/27.1
[58] Field of Search ............... 200/295, 296; 248/27.1, 248/27.3

[56] References Cited

U.S. PATENT DOCUMENTS

| 1,177,923 | 4/1916 | Brown. | |
|---|---|---|---|
| 2,444,888 | 7/1948 | Baumgardner | 285/DIG. 22 |
| 3,412,225 | 11/1968 | Rogers. | |
| 3,453,408 | 7/1969 | Mune. | |
| 3,701,870 | 10/1972 | Sorenson. | |
| 3,708,640 | 1/1973 | Fuller | 200/296 |
| 3,987,265 | 10/1976 | Piber | 200/296 |
| 4,211,905 | 7/1980 | Quigley | 200/295 |
| 4,327,264 | 4/1982 | Botz | 200/296 |
| 4,386,252 | 5/1983 | Kondo et al. | 200/296 |
| 4,434,339 | 2/1984 | Ohashi | 200/295 |

FOREIGN PATENT DOCUMENTS

| 2734275 | 2/1979 | Fed. Rep. of Germany ... 200/159 R |
| 2915333 | 10/1980 | Fed. Rep. of Germany ..... 248/27.1 |
| 798431 | 5/1936 | France .............................. 339/91 R |
| 603018 | 4/1978 | U.S.S.R. ............................... 200/303 |

Primary Examiner—John W. Shepperd
Attorney, Agent, or Firm—Saidman, Sterne, Kessler & Goldstein

[57] ABSTRACT

A snap-in panel mount circuit breaker has a case and a locking dog means including a rigid member with a cammed outer surface mounted in the case. A first set of lugs extends from opposite sides of the rigid member and are disposed in cooperating pivot openings in the case to form a pivot axis about which the rigid member is moveable between a first position, in which the rigid member projects outwardly of the case, and a second position, in which the rigid member is disposed substantially flush with the case. A second set of lugs extends from the rigid member in spaced relation to the first lugs. The second lugs are disposed in a guide channel in the case to define the arc of rotation of the rigid member about the pivot axis. A bias spring contained in the case engages the locking dog means to normally urge the locking dog means towards the first position.

22 Claims, 6 Drawing Figures

SNAP IN PANEL MOUNTED CIRCUIT BREAKER

BACKGROUND OF THE INVENTION

This invention relates to circuit breakers. More particularly, the invention relates to a snap-in panel mounted circuit breaker.

Circuit breakers of the general type to which this invention is directed are usually mounted on equipment panels. Typically, for each breaker to be mounted, the panel will have a cut-out for the breaker handle, and two adjacent screw holes aligned with corresponding threaded openings in the breaker face. Each breaker will then be individually screwed into the panel. This is a time consuming and labor intensive operation which is not well suited to maintaining cost effective manufacturing techniques, particularly in certain industries. The electronics industry, for example, uses large numbers of panel mounted breakers. Large mainframe computers usually have a breaker connected to each main circuit. Such computers will employ racks of panels containing hundreds of breakers that must be individually mounted to the panel and individually wired to the circuit it is intended to protect. It is desireable to streamline the circuit breaker mounting and wiring operations and reduce their labor intensity as much as possible.

Attempts have been made in the past to overcome the circuit breaker panel mounting and wiring difficulties discussed above. One such technique is the use of a snap-in panel mounted breaker. A snap-in mounting arrangement allows the technician to mount the breaker from the front of the panel by pressing it into an opening of a suitable size to accommodate the entire breaker casing, except for a front cover plate. Spring fingers having cammed surfaces engage the edges of the panel and lock the breaker in place when it has been pushed all the way into the opening. One such snap-in panel mounted breaker that has been commercially developed is shown in U.S. Pat. No. 3,453,408, issued July 1, 1969 to C. Mune. Other snap-in panel mounted switches are shown in U.S. Pat. No. 2,703,662, issued Mar. 8, 1955 to E. A. Meyer and U.S. Pat. No. 2,223,673, issued Dec. 3, 1940 to H. Catron et al.

One feature that is common to each of the devices shown in the Mune, Meyer, and Catron et al. patents is that the means for retaining the breaker in the panel opening are all spring clip members formed from resilient material. With the exception of one embodiment disclosed in the Mune '408 patent, the spring clips are all formed from metal stampings. This presents a problem where it is necessary to meet certain tolerance specifications on a mass production level. It is very difficult to mass produce stamped spring arm members of the type used in the assembly shown in the Mune, Meyer, and Catron et al. patents that all have the same or substantially the same resiliency within the required tolerances.

Another problem that occurs with the spring arm devices of the prior art, and particularly with the snap-in panel mounted breaker of the type shown in the Mune '408 patent, is that they are removable merely by pulling on the handle with suficient force to overcome the securing force exerted by the spring arm. This tends to dimininsh the security of the mounting of the breaker and can lead to damage to the spring arms.

The present invention provides a new and improved type of snap-in panel mount circuit breaker assembly which avoids the problems associated with prior art devices. In particular, the present invention is capable of providing a mass producible snap-in assembly that stays within required tolerance specifications and which is not subject to being pulled out of the panel merely by pulling on the handle of the breaker.

SUMMARY OF THE INVENTION

The present invention utilizes a spring-loaded locking dog assembly that incorporates a pair of molded plastic (or other suitably rigid) members mounted in openings in the breaker end faces (or the "top" and "bottom" faces) for pivotal movement relative to the end faces. Each locking dog member has two sets of pins extending outwardly therefrom; the lower set of pins mounts in pivot holes in the case halves. The upper set of pins rests in cut-out guide channels in the upper part of the breaker case. The inside face of the free end portion of each locking dog member has a conically shaped part. The spring sits in a channel in the breaker case so as to normally urge the locking dog member outwardly toward its extreme outermost pivoted position dictated by the shape and length of the guide channel. The locking dog member has an angled face which rests against the inside corner of the panel cut-out in which the breaker is snap-fitted. If desired, the surface of the locking dog member that contancts the panel corner may be serrated for greater locking effectiveness. The cover plate is formed as an integral part of the breaker casing. This provides additional room in the breaker casing walls for forming the guided channel and the spring receiving recess without requiring alterations in the breaker mechanism itself. The upper portion of the case ends are beveled outwardly for a twofold purpose: (a) to provide adequate room for the guide channel and pivot axis of the locking dog member; and (b) to expand the case dimensions in the panel wall regions to more nearly match the panel opening dimensions and limit the amount of play between the case ends and the panel opening edges.

DESCRIPTION OF THE PREFERRED EMBODIMENT

The snap-in mountable circuit breaker of this invention will be described below with respect to a preferred embodiment shown in the appended drawing. The circuit breaker operating mechanism contained in the circuit breaker case is not shown. The operating mechanism forms no significant part of the present invention, which is directed to the snap-in mounting subassembly. A suitable circuit breaker operating mechanism for the breaker of this invention is shown in detail in the present inventor's U.S. patent application Ser. No. 486,716, filed Apr. 20, 1983, titled CIRCUIT BREAKER, and commonly assigned with the present invention. The disclosure of said application Ser. No. 486,716 is incorprated herein by reference in its entirety, as though set forth in full below.

Figure 1:
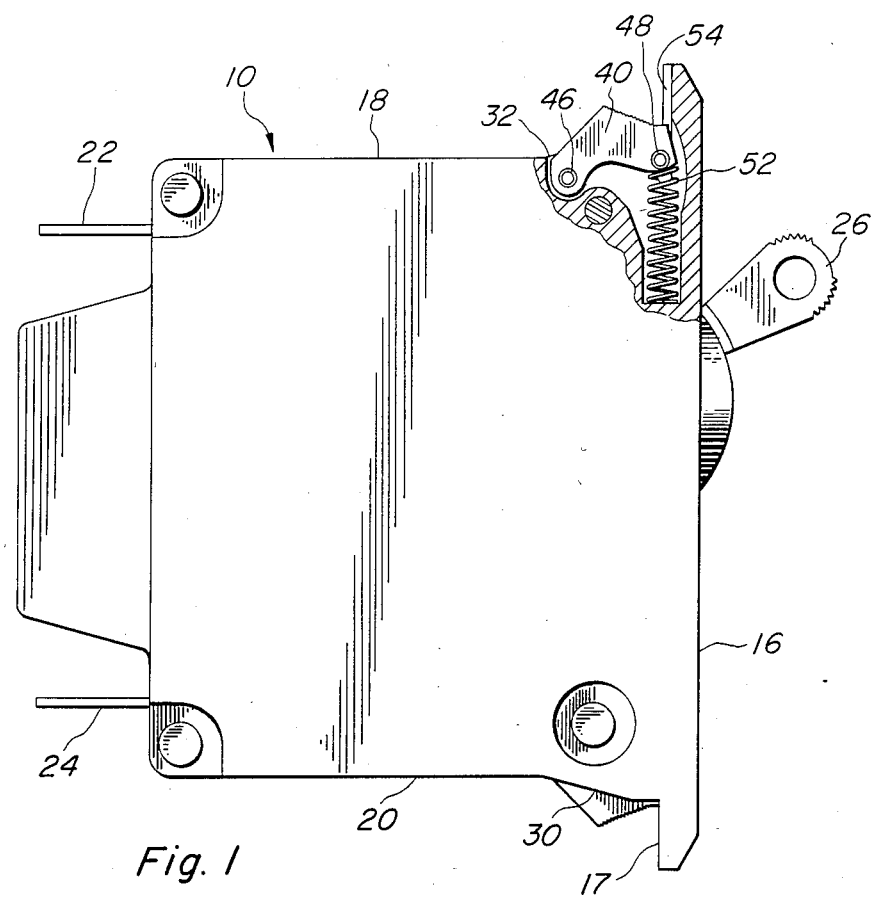
FIG. 1 is a partially cut away side view of the circuit breaker case showing the snap-in mounting assembly of this invention.
Figure 2:
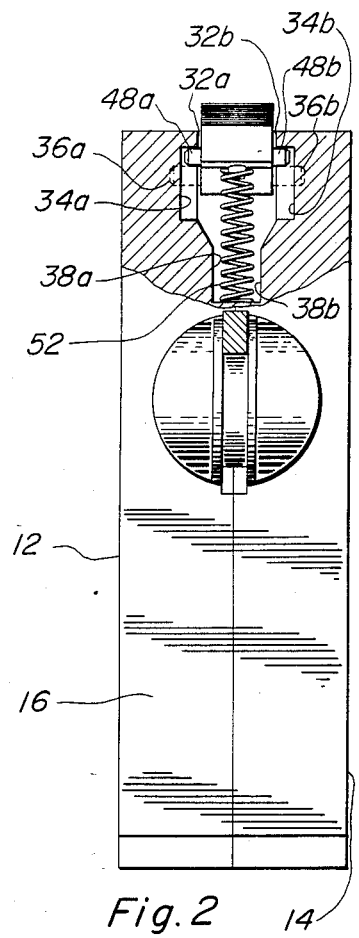
FIG. 2 shows a partially cut away front view of the circuit breaker showing the snap-in mounting assembly of this invention.
Figure 6:
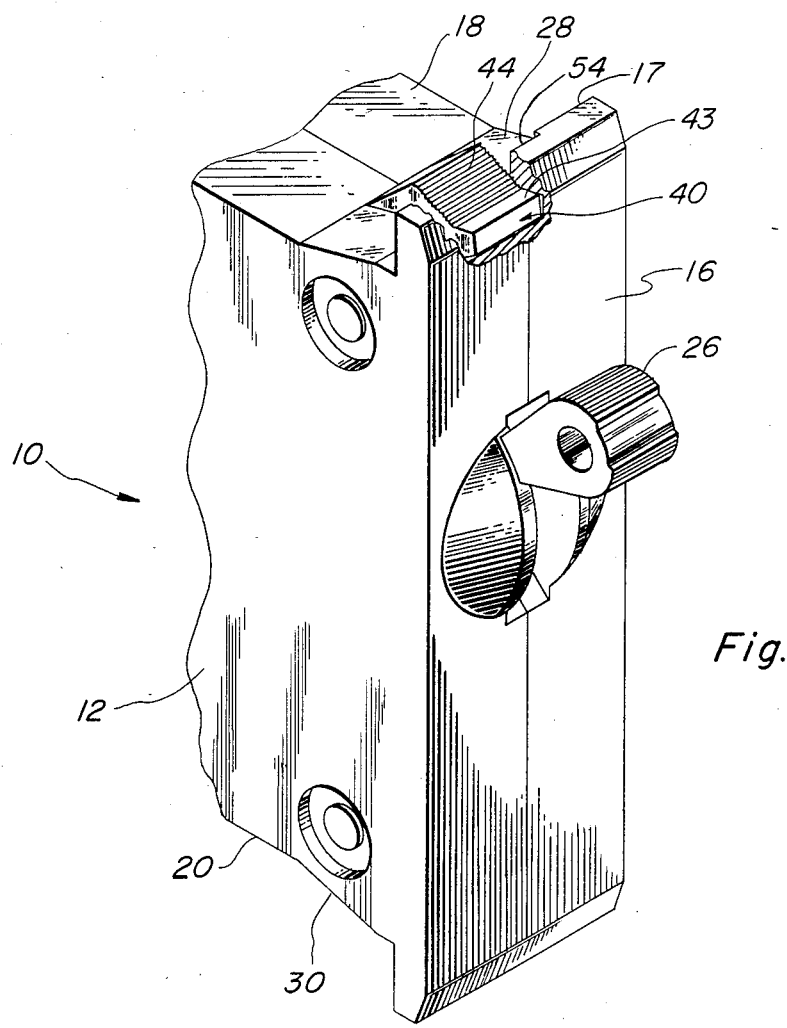
FIG. 6 is a partially cut away perspective view of the circuit breaker showing a locking dog member disposed at one end portion of the breaker.

Referring first to FIGS. 1, 2, and 6 a cricuit breaker case, generally designated 10, is formed from two case halves; for convenience, but now by way of limitation, these are referred to below as the left case half 12 and right case half 14, respectively. A cover plate, generally designated 16, is composed of two complementary halves integrally formed with case halves 12 and 14, respectively. It is advantageous to form the cover plate 16 as an integral part of the breaker case 10 in order to provide additional room in the breaker case for the component parts of the snap-in mounting assembly without requiring significant modifications to the portions of the breaker case that are designed to accommodate the operating mechanism. Thus, by forming the cover plate as an integral part of the breaker case, additional space is created within the case to accommodate the recesses and the openings needed to mount the component parts of the snap-in mounting assembly.

The breaker case 10 is generally hexahedronally shaped and includes portions which, for convenient reference but not by way of limitation, are designated top end portion 18 and bottom end portion end 20, respectively. Electrical terminals 22 and 24 extend outwardly from the rear of the breaker case 10 (i.e. opposite the front portion of the case incorporating the cover plate 16). A handle member 26 extends outwardly from the cover plate 16. When the breaker is mounted in a panel, handle 26 is accessible for manually opening and closing the breaker.

The circuit breaker of this invention is intended to be mounted in a panel that is dimensioned to be slightly larger than the outside dimensions of the breaker case (not including the overlap of the cover plate). In accordance with the usual industry practice, the long dimension of the panel opening (the distance from top to bottom) is significantly greater than the top to bottom case dimension. Thus a certain amount of play will occur when the breaker is mounted in the panel opening. To reduce the amount of play and at the same time increase the mounting security of the snap-in mount breaker of this invention in the opening, the end portions 18 and 20 are bevelled outwardly at regions 28 and 30, respectively, adjacent the front portion of the case. The outward bevelling of the case at regions 28 and 30 results in the case dimension in the panel region (when the case is mounted) closely approximating the panel opening long dimension, thereby reducing the amount of longitudinal play between the mounted breaker and the panel. Since the top to bottom dimension at the rear portion of the breaker is not increased, it remains relatively easy to quickly mount the breaker in the panel opening; a realtively large tolerance is still maintained between the panel opening and the portion of the breaker inserted first into the opening.

The remainder of the snap-in mounting assembly of this invention will be described only with respect to the assembly associated with the top end 18 of the breaker. It should be noted that the snap-in mounting assembly associated with the bottom end 20 of the breaker is essentially identical to and duplicative of the top snap-in assembly. Thus while the discussion below may refer to "top end" members or portions, the corresponding "bottom end" members or portions duplicate those described below. Also in the discussion below, elements or members will be designated generally only by a reference number; specific references to a member associated with a particular case half will include the additional reference "a" or "b" for left or right, respectively.

An opening 32 is formed in the top end 18 of case 10 in the region adjacent the underside 17 of cover plate 16. Opening 32 communicates with an elongated spring mounting channel 38 that extends inwardly of the case. Opening 32 is formed and defined by cut-away portions 32a and 32b in the left case half 12 and right case half 14, respectively. Spring mounting channel 38 is formed and defined by recesses 38a and 38b formed in left case half 12 and right case half 14, respectively.

Intermediate opening 32 and channel 38 are recesses or guide channels 34a and 34b formed in case halves 12 and 14, respectively. A cylindrical recess or mounting hole 36a is located rearwardly of guide channel 34a in the left case half 12. A corresponding cylindrical mounting hole or recess 36b is located rearwardly of guide channel 34b in right case half 14.

Figure 3:
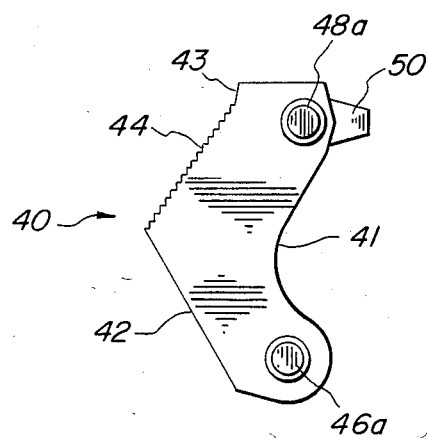
FIG. 3 is a side view of the locking dog member.
Figure 4:
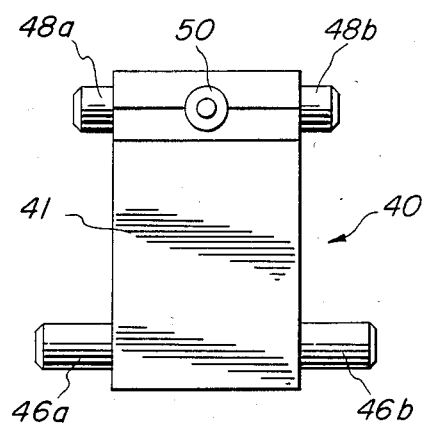
FIG. 4 is a front view of the locking dog member.
Figure 5:
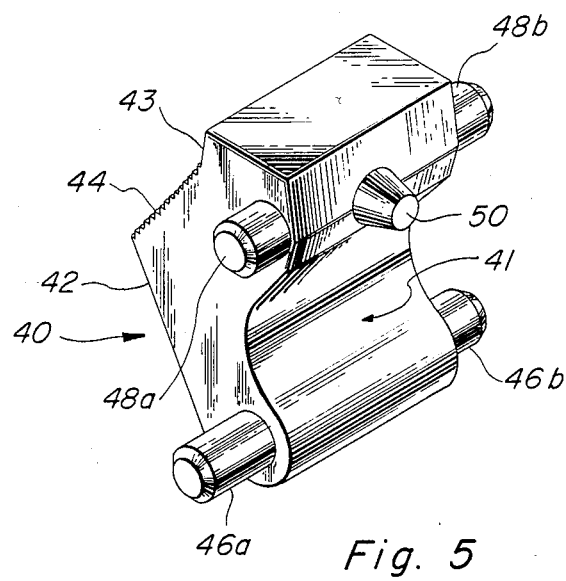
FIG. 5 is a perspective view of the locking dog member.

FIGS. 3–5 show in detail the rigid locking dog member 40 that is disposed in the opening 32 of the assembled breaker case. The locking dog 40 may advantageously and preferably be made of a molded thermoplastic material. The principal requirements are that the material by relatively strong aand unyielding under pressure, such as that which would be applied by a technician pushing clip on leads onto the terminals 22 and 24 of a panel mounted breaker. The locking dog 40 has a cammed outer surface 42 which may advantageously, but not necessarily, have a serrated face portion 44 to provide greater gripping power against the panel opening edge, as will be described in more detail below.

A first set of lugs or pivot pins 46a, 46b extend outwardly from the sides of locking dog member 40 adjacent one end portion thereof. A second set of lugs or guide pins 48a, 48b extend outwardly from the sides of locking dog member 40 adjacent the other end portion thereof. A mounting lug 50 extends from the front inner face 41 of the locking dog member 40 adjacent the same end portion from which guide pins 48 extend. Pivot pins 46 seat in corresponding openings 36 in the assembled breaker case to define a pivot axis about which locking dog member 40 is rotatable. Guide pins 48 seat in and are moveable in guide channel 34 in the assembled breaker case. Rotational movement of the locking dog member 40 is limited to the amount which guide pins 48 are moveable in guide channel 34. The primary function of guide channels 34 and associated guide pins 46 is to prevent excessive outward pivotal movement of locking dog member 40.

The locking dog member 40 is normally biased outwardly by bias means 52, in the form of a compression spring located in bias spring mounting channel 38. One end of compression spring 52 rests against an inner wall of recess 38; the other, free end portion of spring 52 mounts on spring mounting lug 50 to normally urge locking dog member 40 outwardly (in a counterclockwise direction of rotation about pivot pins 46, in FIG. 1).

As with other snap-in panel mount circuit breakers, such as of the type shown in the Mune '408 patent, the snap-in panel mount circuit breaker of this invention is inserted into the panel opening from the front. As the breaker is inserted, the top edge of the panel opening contacts cammed surface 42. As the breaker is inserted further, the locking dog member 40 yields against the panel opening edge and pivots about pivot axis 46 (in a clockwise direction in FIG. 1) against the biasing force of spring 52. When the breaker is pushed all the way into the panel opening, until the under surface 17 of cover plate 16 rests against the panel face, cam face 44 engages the panel opening edge. The locking dog 40, which is biased outwardly by spring 52, thereafter locks the circuit breaker in place in the panel opening.

Under normal conditions, when a force is applied against the back of the breaker, such as, for example by a technician pressing clip-on leads onto terminals 22 and 24, the reactive force exerted by the panel edge against the locking dog 40 causes the locking dog to tend to rotate further outwardly (counterclockwise in FIG. 1). The effect is to further increase the securing force securing the breaker to the panel.

The underside 17 of cover plate portion 16 is provided with a slot or groove 54 that extends from the outer edge of the cover plate toward and into opening 32. A face portion 43 of locking dog 40 lies in the path of slot or groove 54. A flat bladed tool of any suitable type may be inserted into the groove 54 sufficiently to engage surface 43 and urge locking dog 40 against the biasing force of spring 52. If sufficient force is exerted on the flat bladed tool to pivot the locking dog 40 about pivot axis 46 to its inner limit of travel (against the inner wall of guide channel 34 defined by recess 34a, 34b), the locking dog 40 will clear the edge of the panel opening, after which a twisting action on the flat bladed tool will cause the breaker to pop out of the panel.

The present invention may be embodied in other specific forms without departing from the spirit or essential characteristics thereof. The present embodiment is presented merely as illustrative and not restrictive, with the scope of the invention being indicated by the claims rather than by the foregoing description. All changes which come within the meaning and range of equivalency of the claims are therefore intended to be embraced therein.

What is claimed is:

1. A snap-in panel mount circuit breaker, comprising:
   a case comprising first and second case halves, said case halves having a pair of oppositely disposed end wall portions with cooperating cut-out portions that together define end wall openings and a cover plate portion for covering the opening of a panel through which said breaker is inserted for mounting said breaker;
   locking dog means mounted in said end wall openings for pivotal movement between a locking position and a release postion, each of said locking dog means including a rigid member having a cammed outer surface engageable with an edge surface of a panel in which said breaker is mounted and having first and second sets of lugs;
   bias means disposed in said case in engagement with said locking dog means for normally urging said locking dog means outwardly of said end walls toward said locking position into engagement with an edge surface of the opening in the panel in which said breaker is mounted;
   first and second sets of cooperating recesses located in said first and second case halves, respectively, which mate with said first and second sets of lugs, respectively, said first set of lugs and first set of recesses together defining a pivot mounting assembly about which said rigid members are pivotable, and said second set of lugs and second set of recesses together defining limit means for limiting the outward rotational movement of said rigid members for guiding said rigid member in pivotal movement inwardly against the action of said bias means between said locking and said release positions; and
   access means for providing access to said locking dog means from the front of the panel in which said breaker is mounted with a suitable tool to disengage said rigid member from the edge surface of said panel in which said breaker is mounted to permit said breaker to be removed from said panel.

2. A circuit breaker according to claim 1, wherein:
   said case further comprises first and second case halves with cooperating cut-out portions that together define said end wall openings;
   said guide slot means comprises first and second sets of cooperating recesses located in said first and second case halves, respectively; and
   said guide lug means comprises first and second sets of lugs which mate with and seat in said first and second sets of recesses, respectively, said first set of lugs and first set of recesses together defining a pivot mounting assembly about which said locking dog means is pivotable, and said second set of lugs and second set of recesses together defining a guide channel for limiting the outward rotational movement of said locking dog means.

3. A circuit breaker according to claim 2, wherein:
   said bias means comprises compression spring means;
   said case halves further include third sets of cooperating recesses which define bias spring mounting means having a wall against which one end portion of said bias spring means rests; and
   said rigid member includes a further mounting lug which seats in the opposite end portion of said bias spring means for securing said bias spring means between said case and said locking dog means.

4. A circuit breaker according to claim 1, 2, or 3, wherein said guide slot means further comprises grooves formed in said cover plate and extending from outer edges thereof inwardly towards said openings in said end walls to thereby provide paths of open communication to said locking dog means when said breaker is mounted to a panel in an operative position.

5. A circuit breaker according to claim 4, wherein said cover plate comprises a pair of matching cover plate halves integrally formed with said respective case halves and forming a unitary structure therewith.

6. A circuit breaker according to claim 2, wherein:
   said case halves include cooperating mounting holes through which securing members pass to secure said case halves to each other; and
   said rigid members have inner surfaces shaped to define clearance recesses whereby said rigid members avoid said case half securing members when said rigid members are pivoted inwardly towards said release position.

7. A circuit breaker according to claim 6, wherein said case has front and rear face portions, and said end walls further have outwardly bevelled portions located adjacent said front face portions, such that the longitudinal distance between the bevelled portions of said end walls is greater than the longitudinal distance between said end walls adjacent the rear face portion of said case.

8. The circuit breaker of claim 1 wherein said bias means comprises a compression spring.

9. The breaker of claim 8 wherein said case halves further comprise mating recesses for receiving said compression spring therein.

10. A snap-in panel mount circuit breaker mountable in an opening in a panel, comprising:
   a case composed of first and second case halves, each having cooperating openings and first and second sets of recesses formed therein, said case including means for preventing passage of said breaker completely through said opening in said panel;
   locking dog means including a rigid member having a cammed outer surface, and said rigid member further comprising first and second sets of lugs which mate with and seat in said first and second sets of recesses, respectively, said first set of lugs and first set of recesses together defining a pivot mounting assembly about which said rigid member is pivotable, and said second set of lugs and second set of recesses together limiting outward rotational movement of said rigid member; and
   bias means contained in said case and engaging said locking dog means to normally urge said locking dog means outwardly.

11. A circuit breaker according to claim 10, wherein:
   each case half further comprises first and second sets of cooperating recesses, said second cooperating recesses defining said guide channel means; and
   said locking dog means further comprises first and second sets of lugs which mate with and seat in said first and second sets of recesses, respectively, said first set of lugs and first set of recesses together defining a pivot mounting assembly about which said locking dog means is pivotable, and said second set of lugs being disposed in said guide channel means to thereby comprise said movement limiting means for limiting the outward rotational movement of said locking dog means.

12. A circuit breaker according to claim 11, wherein:
   said bias means comprises compression spring means;
   said case halves further include third sets of cooperating recesses which define bias spring mounting means having a wall against which one end portion of said bias spring means rests; and
   said rigid member includes a further mounting lug which seats in the opposite end portion of said bias spring means for securing said bias spring means between said case and said locking dog means.

13. A circuit breaker according to claim 12, wherein:
   said case includes a cover plate; and
   grooves formed in said cover plate and extending from outer edges thereof inwardly towards said openings in said case halves to thereby provide a means of open communication to said locking dog means when said breaker is mounted to a panel in an operative position.

14. A circuit breaker according to claim 13, wherein said cover plate comprises a pair of matching cover plate halves integrally formed with said respective case halves and forming a unitary structure therewith.

15. A circuit breaker according to claim 10, wherein:
   said case has a pair of oppositely disposed end walls and front and rear face portions, each end wall having said cooperation openings therein with said locking dog means being mounted for movement in said end wall openings; and
   said end walls further having outwardly bevelled portions located adjacent said front face portions, such that the longitudinal distance between the bevelled portions of said end walls is greater than the longitudinal distance between said end walls adjacent the rear face portion of said case.

16. The breaker of claim 10 wherein said bias means is a compression spring.

17. The breaker of claim 16 wherein said case halves further comprise cooperating recesses for receiving said compression spring therein.

18. A snap-in panel mount circuit breaker, comprising:
   a case for containing a breaker operating mechanism including a pair of relatively movable electrical contacts and means for opening and closing said contacts, said case comprising first and second cooperating case halves, each having oppositely disposed end walls containing cut-out portions, the cooperating cut-out portions of said first and second case halves together forming oppositely disposed end wall openings;
   first elongated recesses formed in said case halves adjacent respective ones of said cut-out portions;
   second recesses formed in said case halves adjacent respective ones of said cut-out portions and spaced from respective ones of said first recesses;
   locking dog means contained in and extendable out of said end wall openings for engaging respective edge portions of a panel opening through which said breaker is inserted to secure said breaker to said panel, said locking dog means comprising a locking member having a cammed outer surface and first and second lugs which mate with and seat in respective ones of said first and second recesses in said case halves, said first lug and first recess together forming limit means for limiting the maximum outward movement of the locking dog means, and said second lug and second recess defining an axis about which said locking member is pivotable; and
   bias means disposed in said case in engagement with said locking member and normally urging said locking member toward the maximum outward limit of movement thereof.

19. The breaker of claim 18 wherein said bias means comprises a compression spring.

20. The breaker of claim 19 wherein said case halves have third recesses formed therein for retention of said compression spring.

21. The breaker of claim 18 wherein each of said locking members has first and second planar surfaces which together define said cammed outer surface, wherein a first one of said planar surfaces is smooth and the other is serrated for positive interaction with the edge of an opening in a panel.

22. The breaker of claim 18 wherein the cutout portions of said first and second case halves and said locking dog means are cooperatively shaped such that said locking dog means pivots substantially into said case when said case is inserted into an opening in a panel.

* * * * *